June 24, 1969 T. A. ROGERS 3,451,487
VIBRATING PLOW
Filed Nov. 30, 1964

THELMER A. ROGERS
INVENTOR.

BY:

June 24, 1969  T. A. ROGERS  3,451,487
VIBRATING PLOW

Filed Nov. 30, 1964

THELMER A. ROGERS
INVENTOR.

BY:

United States Patent Office 3,451,487
Patented June 24, 1969

---

3,451,487
VIBRATING PLOW
Thelmer A. Rogers, P.O. Drawer 1589,
Lubbock, Tex. 79408
Filed Nov. 30, 1964, Ser. No. 414,803
Int. Cl. A01b *35/02, 35/00*
U.S. Cl. 172—40        7 Claims

ABSTRACT OF THE DISCLOSURE

A vibrator attached to a subsoil cultivator has two parallel shafts geared together to turn the same speed in opposite directions. Each carries an eccentric weight. One eccentric weight may be adjusted as to the rotational position upon its shaft and the other eccentric weight may be adjusted as to eccentricity. Therefore, it is possible to get rectilinear vibrations or elliptical vibrations with varying degrees of ratios between the long axis and short axis of the ellipse, as well as positioning the axis of the ellipse in different positions.

---

This invention relates to agricultural tillage implements and more particularly to vibrating plows.

In tilling, particularly in deep plowing, it is recognized that vibrating the tillage tool or implement causes it to do a better job of pulverizing the soil and that less draft is required for as deep or deeper plowing. Rotating an eccentric weight is one way of accomplishing this vibration.

Also experimentation has shown that different vibrations are better for different type soils. In certain type soils, to achieve certain results, a horizontal, linear vibration is most effective. In other type soils, and to achieve other results, a vertical linear vibration is best. There will be situations where an oscillatory vibration or a circular vibration in a plane normal to the direction of draft is most advantageous. At other times it is more advantageous to have a more elliptical vibratory path in a plane normal to the direction of the draft with the long axis of the ellipse either vertical or horizontal.

An object of this invention is to provide means for vibrating a plow.

Another object of this invention is to provide a means which will readily produce a variety of different patterns of vibration as discussed above.

Another object is to provide a vibrating plow which will give a variety of patterns of vibration readily changeable from one pattern to another.

Still further objects are to achieve the above with a device that is sturdy, rugged, compact, durable, simple, versatile, and reliable, yet inexpensive and easy to manufacture and operate.

The specific nature of the invention as well as other objects, uses, and advantages thereof will clearly appear from the following description and from the accompanying drawing, the different views of which are not necessarily to the same scale, in which.

Figure 1:
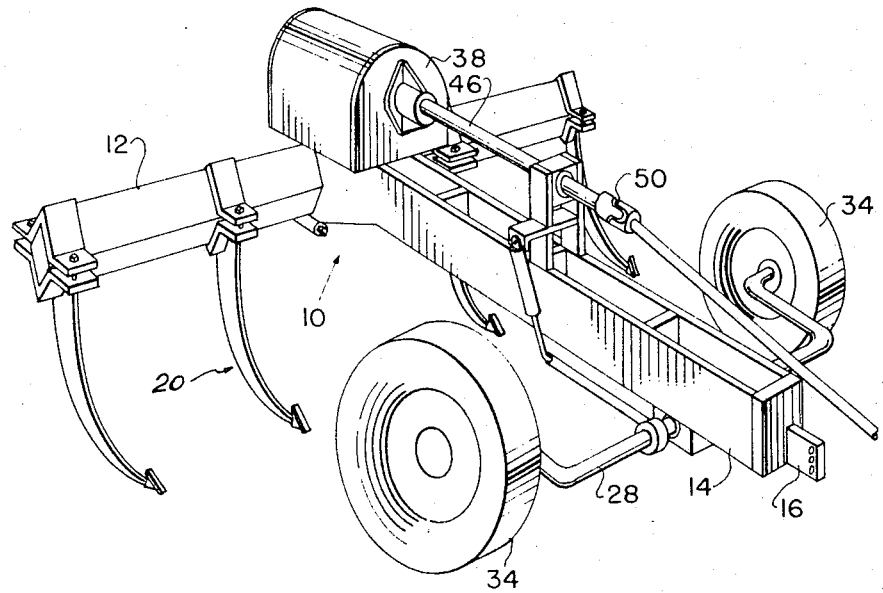
FIG. 1 is a perspective view of a plow according to this invention.

Referring more particularly to the drawing, it may be seen that there is provided a plow having a frame 10. This frame 10 includes a horizontal tool bar 12 and tongue 14. Hitch 16 at the forward end of the tongue 14 provides means for attaching the frame 10 to a draft vehicle not shown. Thus means attached to the frame are provided for moving the plow or earth working implement along the ground to be worked. The tongue 14 generally parallel to the direction of draft, tool bar 12 at right angles thereto. In the instant embodiment the tool bar is attached to the tongue 14 by a clamp including bolts 18. A plurality of subsoiling tillers 20 depend from the tool bar 12. They are attached to the tool bar by clamps 22 and include shanks 24 which have points 26 attached to the bottom thereof.

Crank axle 28 is journalled to the frame 10 along the tongue 14 and is rotated by hydraulic cylinder 30 which is attached between the frame and arm 32 on the axle 28. Wheels 34 are attached on either end of the crank axle 28. Activation of the cylinder 30 by hydraulic pressure from the draft vehicle (not shown) will cause the wheels to raise or lower that is to have vertical movement. This vertical movement will adjust the engagement of the soil tillers 20 with the earth.

It will be understood that the elements described above themselves are old and as individual elements are not a part of this invention.

U-shaped bracket 36 is attached to the frame 10 with the legs 38 and 40 of the U-shaped bracket 36 extending upward. The U-shaped bracket is made of heavy plate so that it forms a rigid support for bearings 42 and 44 which are located in the legs 38 and 40 respectively. Thus it may be seen that the legs 38 and 40 form a spaced support for the bearings. First shaft or forward shaft 46 is journalled through bearing 42 in the forward leg 38. The forward shaft terminates between the legs 38 and 40 and on its rear terminal has gear 48. The forward shaft 46 is horizontally parallel to the direction of draft. The forward shaft 46 extends forward and is connected through universal slip joint 50 to the power take-off of the draft vehicle. Thus means are provided for rotating the shaft 46. Rear shaft of second shaft 52 is journalled for rotation in the rear bearing 44 in the rear leg 40. It is horizontal, parallel to the direction of draft and parallel to the forward shaft 46. The forward end of the rear shaft 52 terminates between the legs 38 and 40 and gear 53 is attached to the forward terminal thereof. The gears 48 and 53 are of the same diameter and meshed. Therefore, the shaft 52 is rotated responsive to rotation of the shaft 46 at the same speed and in the opposite direction.

Figure 4:
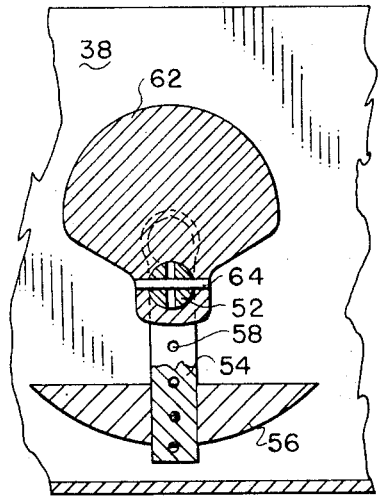
FIG. 4 is a sectional view taken on line 4—4 of FIG. 3.
Figure 5:
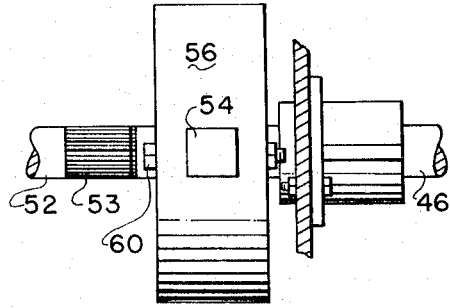
FIG. 5 is a sectional view taken on line 5—5 of FIG. 3.

Radial bar 54 is attached to the forward shaft 46 between the leg 38 and the gear 48. Eccentric weight 56 is attached to the bar 54 so that the eccentric weight is adjustable as to eccentricity. The illustrated way of adjusting the weight 56 is to drill a plurality of holes 58 parallel to the shaft 46. The weight 56 is attached to the bar 54 by means of bolt 60 passing through one of these holes. Therefore, it may be seen the eccentric weight on the forward shaft 46 is adjustable as to eccentricity. Eccentric weight 62 is attached to the rear shaft 52 between the rear leg 40 and the gear 53. The rear eccentric weight 62 is adjustable as to rotational position. This is accomplished by having a plurality of diametrical holes drilled through the shaft 52 and the weight 62 attached to the shaft 52 by a tapered pin 64 passing through one of these holes. It will be understood that inasmuch as the weight 62 is adjustable as to rotational position upon the shaft 52 that the weights may be "timed" with respect to each other. By "timed" I mean that they could be opposite one another as shown in FIG. 4 either when they were in the vertical position or the horizontal position or in some other position.

If the eccentric weights upon the two shafts produce an equal centrifugal force it will be understood that basically a linear vibration will occur. (It will be basically linear inasmuch as there is as much one weight is forward of the other and there will be a certain amount of wobbling or other motion produced; however, inasmuch as the linear vibration force will be so much greater than this secondary wobbling force that the term basically linear is used.)

Figure 2:
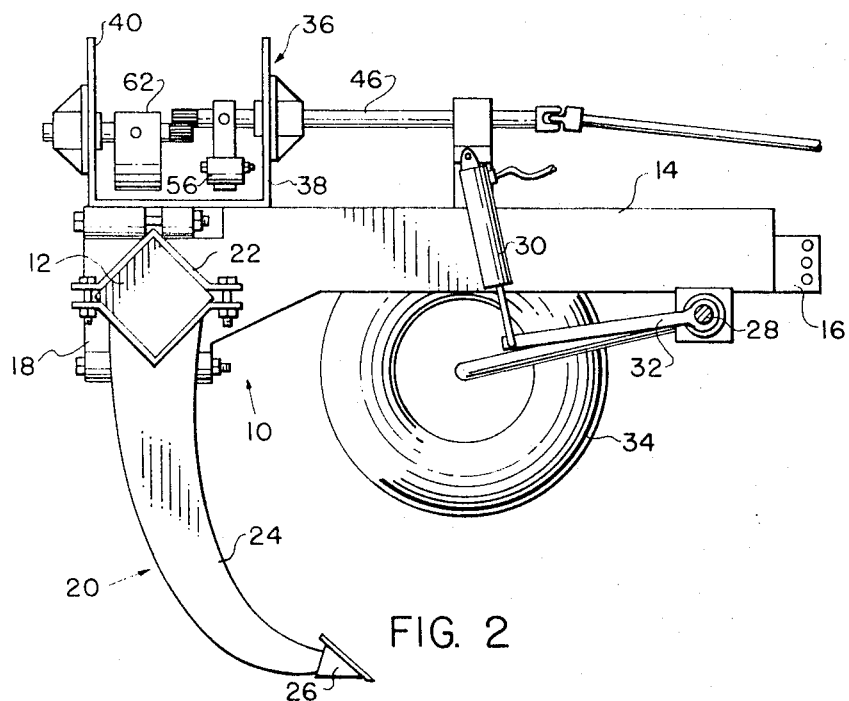
FIG. 2 is a side elevational view of the plow with the cover of the vibrating mechanism removed, and parts broken away for clarity.
Figure 3:
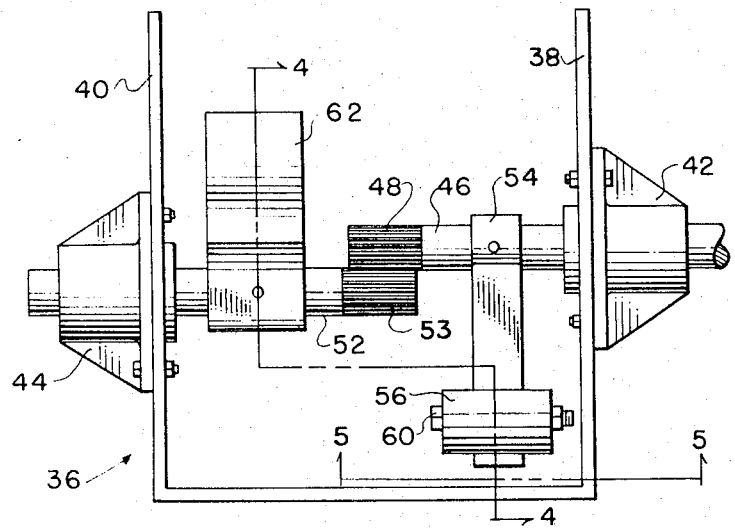
FIG. 3 is an enlarged side elevational view of the vibrating mechanism.

If the weights are timed as shown in FIG. 2, so that they are together in the vertical position and opposite in the horizontal position, the linear vibratory movement will be vertical. If the eccentric weights are timed as shown in FIG. 4 so that they are together when horizontal and vertical when opposite the linear vibrating motion will be horizontal.

If the eccentric weight 56 is adjusted inward from the position where it produces the same centrifugal force as weights 62, an elliptical vibratory force will result. Referring particularly to FIG. 4 it may be seen that as the weight 62 swings to the side and the weight 56 swings to the side that they will both produce a sideway force. However, as the weight 62 moves to the down position from the side position it will exert a greater centrifugal force than the weight 56 and therefore there will be some resultant vertical force in addition to the primary resultant horizontal force. This will result in the basic elliptical pattern of vibration with the long axis horizontal. Analysis of the weights timed as seen in FIG. 2 with the centrifugal force of the weights being unequal will result in a basic elliptical vibratory pattern with the long axis vertical.

If the weight 56 is removed entirely from the bar 54 the vibratory pattern will be basically circular inasmuch as the centrifugal force as produced by the bar 54 will be negligible compared with the vibratory forces produced by the eccentric weight 62.

I prefer to use the U-shaped bracket 36 and the two shafts 46 and 52 in a cantilevered manner because it results in a simpler construction which is inexpensive to build yet extremely rugged for the severe duty the vibration places upon the parts.

Thus is may be seen that I have provided a machine which produces many different patterns of vibratory motion which is rugged, easily adjustable, and inexpensive to build.

It will be apparent that the embodiment shown is only exemplary and that various modifications can be made in construction, materials, and arrangement within the scope of the invention as defined in the appended claims.

I claim as my invention:
1. In an earth working implement having:
   (a) a frame,
   (b) at least one soil tiller depending from said frame, and
   (c) draft means connected to said frame for advancing said implement; the improved means for vibrating said frame and thus said soil tiller comprising:
   (d) two spaced supports attached to said frame,
   (e) a bearing attached to each support,
   (f) a shaft journalled in each bearing,
   (g) said shafts parallel,
   (h) each shaft terminating between the spaced supports,
   (i) a gear on the terminal of each shaft meshed with the gear on the other shaft,
   (j) an eccentric weight on each shaft between the spaced supports,
   (k) means connected to one of the shafts for rotating the shafts, and
   (l) one of said eccentric weights being adjustable as to eccentricity.
2. The invention as defined in claim 1, wherein:
   (m) said shafts are parallel to the direction of draft.
3. The invention as defined in claim 1, wherein:
   (n) one of said eccentric weights is adjustable as to rotational position on the shaft.
4. In a plow having a frame including:
   (a) a horizontal tool bar normal to the direction of draft, and
   (b) an elongated tongue attached to the tool bar, extending along the line of draft,
   (c) a hitch on the forward part of the tongue for attaching the plow to a draft vehicle,
   (d) vertically movable wheels attached to the tongue for raising and lowering the tool bar, and
   (e) a plurality of subsoiling tillers attached to the tool bar; the improved means for vibrating comprising:
   (f) a U-shaped bracket attached to the frame with the legs of the U turned upward,
   (g) a bearing in each leg,
   (h) a first shaft journalled in one bearing
       (i) aligned with the direction of draft
       (ii) with the rear end terminating between the legs of the U-shaped bracket,
       (iii) with the forward end extending forward,
       (iv) a first gear on the rear end of the first shaft, and
       (v) means on the forward end of the first shaft for rotating the shaft,
   (i) a second shaft journalled in the other of said bearings
       (i) parallel to said first shaft
       (ii) with the forward end terminating between the legs of the U-shaped bracket, and
       (iii) a second gear on the forward end of the second shaft, meshed with said first gear,
   (j) a radial bar attached to the first shaft between said first gear and bearing,
   (k) a weight radially adjustably attached to said bar, and
   (l) an eccentric weight rotationally adjustably attached to the second shaft between said second gear and bearing.
5. In an earthworking implement having:
   (a) a frame,
   (b) means attached to the frame for moving it along the area to be worked,
   (c) soil tillers attached to the frame, and
   (d) means for adjusting the engagement of the soil tillers with the earth; the improved means for vibrating comprising:
   (e) a U-shaped bracket attached to the frame with the legs of the U turned upward,
   (f) a bearing in each leg,
   (g) a first shaft journalled in one bearing
       (i) aligned with the direction of draft
       (ii) with the rear end terminating between the legs of the U-shaped bracket,
       (iii) with the forward end extending forward,
       (iv) a first gear on the rear end of the first shaft, and
       (v) means on the forward end of the first shaft for rotating the shaft,
   (h) a second shaft journalled in the other of said bearings
       (i) parallel to said first shaft,
       (ii) with the forward end terminating between the legs of the U-shaped bracket, and
       (iii) a second gear on the forward end of the second shaft, meshed with said first gear,
   (i) a radial bar attached to the first shaft between said first gear and bearing,
   (j) a weight radially adjustably attached to said bar, and
   (k) an eccentric weight rotationally adjustably attached to the second shaft between said second gear and bearing.
6. In an earthworking implement having:
   (a) a frame,
   (b) means attached to the frame for moving it along the area to be worked,
   (c) soil tillers attached to the frame, and

(d) means for adjusting the engagement of the soil tillers with the earth; the improved means for vibrating comprising:
(e) a first shaft journalled to the frame,
(f) means attached to the first shaft for rotating the first shaft,
(g) a second shaft parallel to the first shaft journalled to the frame,
(h) means for rotating the second shaft at equal speed and opposite direction to the first shaft,
(i) an eccentric weight attached to each shaft,
(k) means operatively associated with the means for vibrating for adjusting the eccentricity of at least one eccentric weight, and
(l) means operatively associated with the means for vibrating for adjusting the timing of the weights.

7. In an earthworking implement having:
(a) a frame,
(b) at least one soil tiller depending from said frame, and
(c) draft means connected to said frame for advancing said implement; the improved means for vibrating said frame and thus said soil tiller comprising:
(d) two spaced supports attached to said frame,
(e) a bearing attached to each support,
(f) a shaft journalled in each bearing,
(g) said shafts parallel,
(h) each shaft terminating between the spaced supports,
(i) a gear on the terminal of each shaft meshed with the gear on the other shaft,
(j) an eccentric weight on each shaft between the spaced supports, and
(k) means connected to one of the shafts for rotating the shafts,
(l) one of said eccentric weights being adjustable as to rotational position on the shaft.

References Cited

UNITED STATES PATENTS

| | | | |
|---|---|---|---|
| 1,517,587 | 12/1924 | Roth | 74—61 |
| 2,192,420 | 3/1940 | Stroud | 74—61 |
| 3,211,236 | 10/1965 | Patton | 172—40 |
| 3,220,268 | 11/1965 | Brandt | 74—87 |

FOREIGN PATENTS 517,287   5/1921   France.

ANTONIO F. GUIDA, *Primary Examiner.*

A. E. KOPECKI, *Assistant Examiner.*